UNITED STATES PATENT OFFICE.

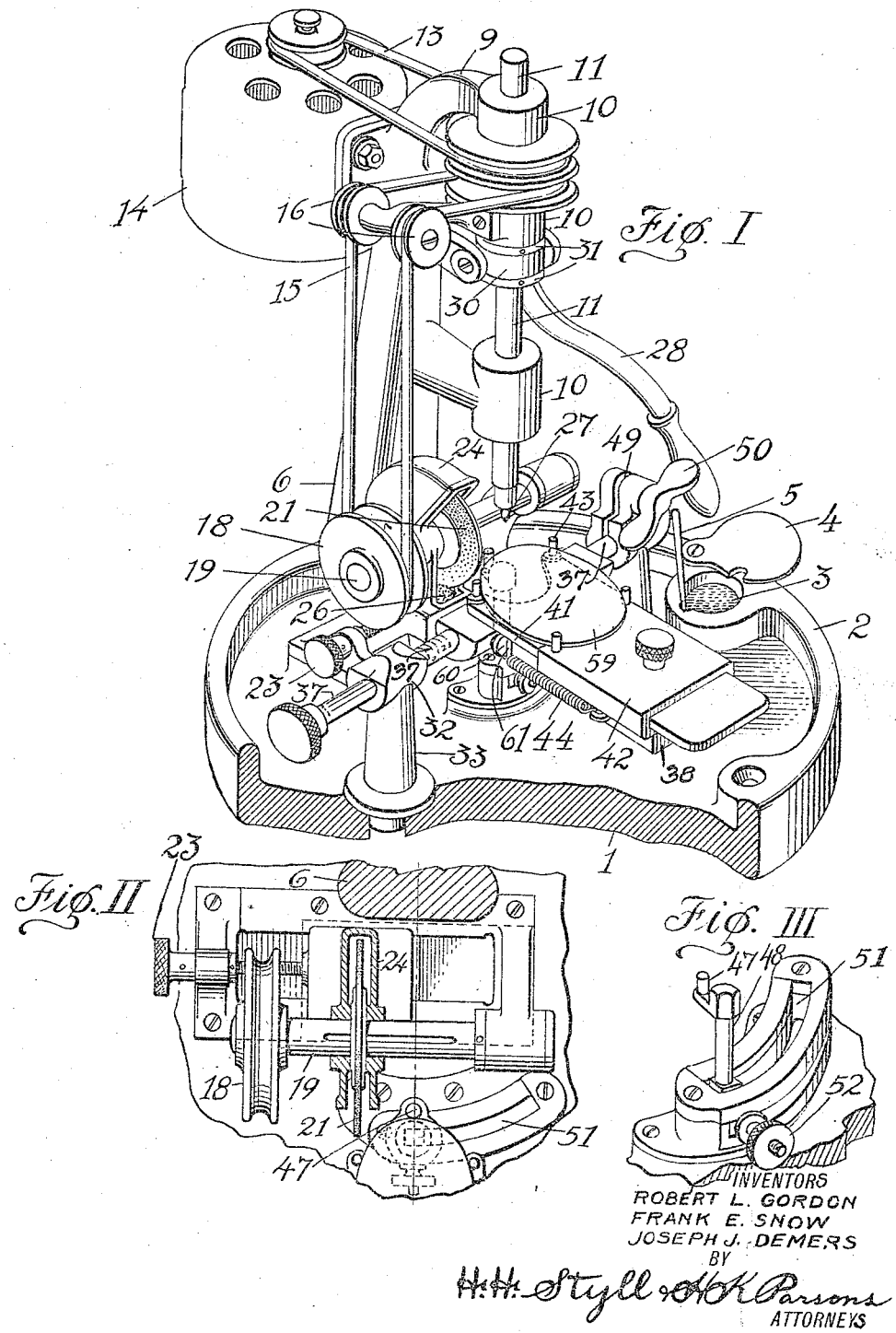

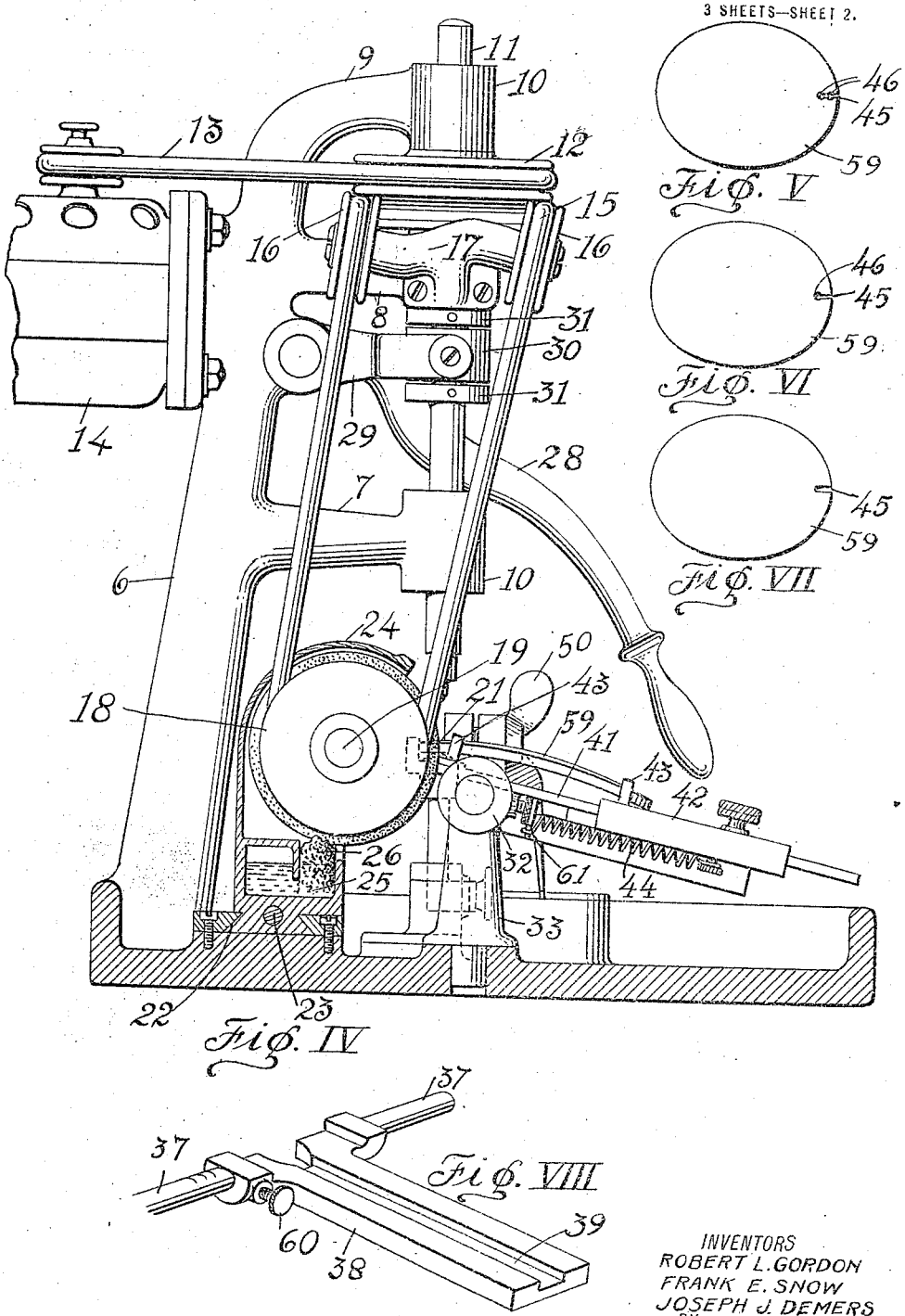

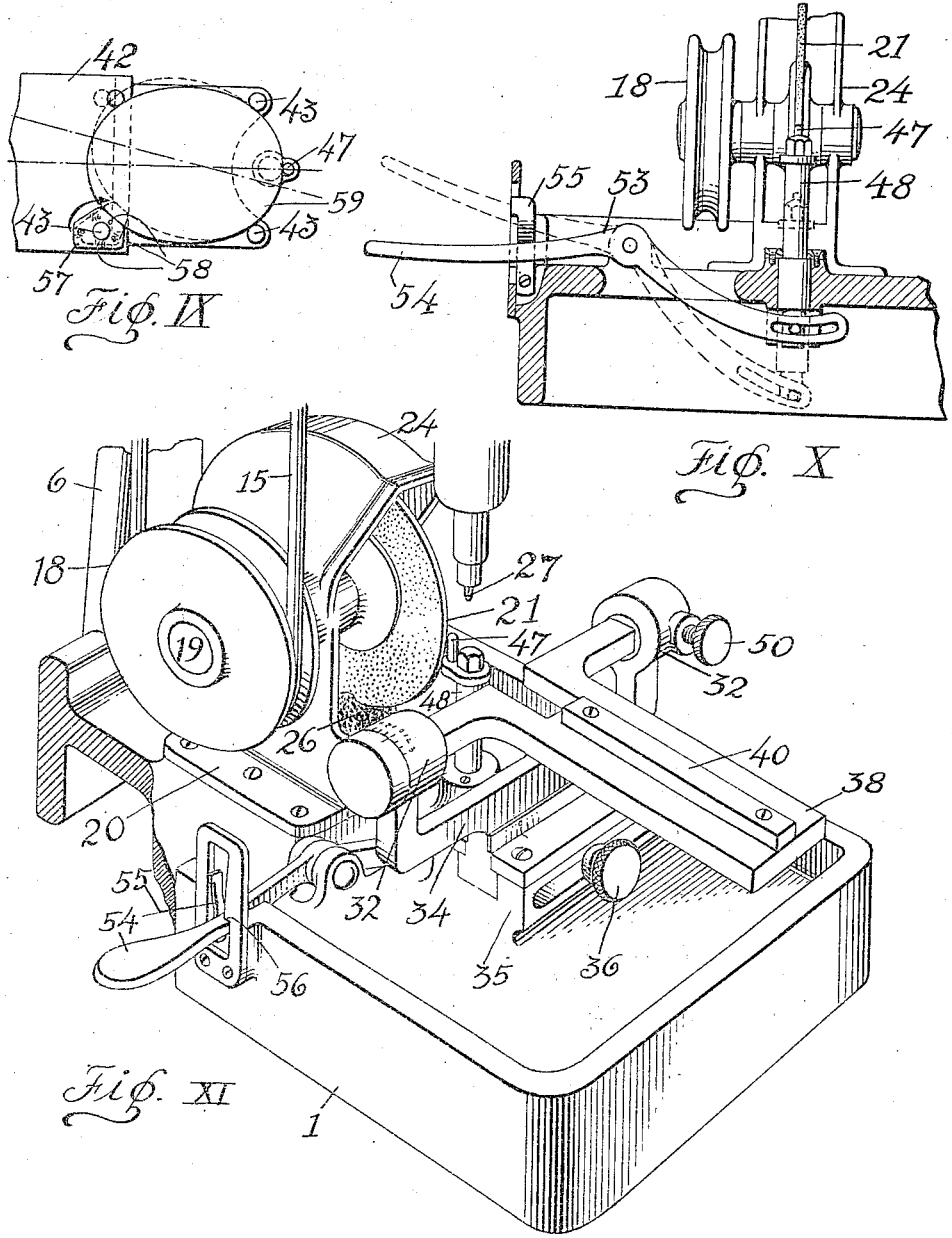

JOSEPH J. DEMERS, ROBERT L. GORDON, AND FRANK E. SNOW, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION.

LENS-PREPARING MACHINE.

1,294,779.   Specification of Letters Patent.   Patented Feb. 18, 1919.

Application filed June 26, 1916.   Serial No. 106,054.

*To all whom it may concern:*

Be it known that we, JOSEPH J. DEMERS, ROBERT L. GORDON, and FRANK E. SNOW, citizens of the United States, residing at Southbridge, in the county of Worcester and State of Massachusetts, have invented certain new and useful Improvements in Lens-Preparing Machines, of which the following is a specification.

Our invention relates to improvements in lens preparing machines and has particular reference to machines adapted for use in preparing ophthalmic lenses to receive their mountings.

One of the leading objects of our invention is the provision of an improved machine particularly adapted for use in connection with cement lens mountings, which machine shall be so constructed to form both a slot or notch in the edge of the lens and also to form a terminal enlargement or the like at the end of the slot, whereby the enlargement will serve to securely interlock with a suitable cementitious filler or the like to aid in retaining the filler and at the same time will serve to break the continuity of the slot and thus the liability of cracking of the lens from a corner of the slot as a starting point.

A further object of our invention is the provision of an improved machine which may be employed for separately forming a slot or a drilled aperture in the lens as may be desired.

Further objects of the invention include the provision of novel and improved means for limiting the movement of the lens during the drilling operation, which means may be later withdrawn out of operative position; the provision of improved means for supporting the lens during the drilling and slotting operation and for attaining all desired adjustments, both lateral and angular, to insure exact positioning of the slot or notch on the lens, and in general a simplification and improvement of the several details of construction and methods of operation of machines of this nature and to provide an improved combination machine having a plurality of parts adapted for sequential engagement and operation upon the lens to produce the finished form of aperture therein.

Figure I represents a perspective view of one form of our machine.

Fig. II represents a plan view of a portion thereof, particularly illustrating the cutting wheel adjustment.

Fig. III represents a perspective view in detail of one form of lens strap.

Fig. IV represents a side elevation of a slightly modified construction of our machine.

Fig. V represents a view of one form of lens aperture formed therewith.

Fig. VI represents a similar view of another form.

Fig. VII represents a view of a plain slot formed with the machine.

Fig. VIII represents a fragmentary perspective view of the bed plate and trunnion of the lens holder.

Fig. IX represents a plan view of the lens holder illustrating the improved decentration member.

Fig. X represents a detail sectional view illustrating means for locking the lens stop in raised position.

Fig. XI represents a perspective view of a slightly simplified form of machine embodying the parts illustrated in Fig. X.

In the drawings, in which similar characters of reference are employed to denote corresponding parts throughout the several views, the numeral 1 designates the base of our improved machine preferably provided with the upstanding peripheral flange 2 to form a tray or pan to prevent spreading of the drilling fluid, a chamber 3 preferably being formed at one side of the pan to receive the melange or drilling and cutting fluid being provided with a pivoted cover 4 notched at one side to receive the handle of the brush or melange applying member 5.

Rising from the base 1, preferably at the rear thereof, is the standard or bracket 6 provided with the arms 7, 8 and 9, each terminating in a journal or bearing portion 10, in which is slidably and rotatably mounted a spindle 11. This spindle has splined or keyed thereon the double pulley 12 which is held against sliding movement by engagement with the journals of the arms 8 and 9 and has passing therearound the driving belt 13 from the motor 14 secured to the standard 6, and in addition the belt 15 which passes over the idlers 16 of the bracket 17 and downward to the pulley 18 on the shaft 19, the shaft 19 being journaled in the bracket 20 and bearing a cutting or slotting wheel 21.

This bracket 20 may be either directly secured to the base, as indicated in Fig. XI for example, or may be slidably mounted in a guide way 22, as most clearly illustrated in Figs. II and IV, in these figures an adjusting screw 23 being provided to control the position of the bracket in the guide way. In either event the bracket is preferably provided with a shield or guard member 24 for protecting the major portion of the cutting wheel and with a liquid receiving chamber 25 having a portion adapted to receive a sponge 26 to feed the moistening fluid from the chamber to the wheel.

It will be noted that the spindle 11 is provided with a drilling point 27, while to bring the drilling point into engagement with the work any suitable actuating mechanism may be employed, that illustrated comprising the shift lever 28 serving to rock the yoke 29 bearing the collar 30 located between the pair of collars 31 on the spindle. In this manner the collar 30 in no wise interferes with the rotation of the spindle but by its engagement with the collars 31 serves to shift the spindle into raised or lowered position as desired.

To suitably support the work to be operated upon by either the cutting wheel 21 or drilling point 27 or both, we provide the bearings 32 which may be either supported by independent posts 33 at the sides of the base 1 or may be at the ends of a single yoke like bracket 34 as indicated in Fig. XI. In the latter event the bracket is preferably slidably mounted in the guide block 35 and locked in adjusted position as by the set screw 36. This latter construction provides for the relative lateral adjustment of the cutting wheel 21 and work holder accomplished in the other forms illustrated by lateral adjustment of the cutter itself, the final result attained being identical.

In either event there are journaled in the bearings 32 the trunnions 37 carried by the bed plate 38 which is also provided with the guide way 39 or guide bar 40 for the sliding lens carriage. This lens carriage may be of any customary and ordinary form comprising the relatively slidable members 41 and 42, each having a pair of spaced pins 43 for engaging the sides of the lens to properly center the same as shown in Fig. I for example, a spring 44 tending to move the two parts of the lens holder into telescoped or overlapped relation so that they will at all times satisfactorily clamp and retain a lens in position between their respective pins.

In Figs. V, VI and VII of the drawings we have illustrated certain forms of lenses or of cuts in lenses which may be produced by our machine. In Fig. VII a plain or straight cut has been shown, such as would be produced by mounting a lens within the lens holding carriage and moving the carriage bodily forward on the slide bed 38 as a guide to bring the edge of the lens against the rotating cutter wheel 21 to be operated on thereby.

In Fig. VI in addition to the straight slot or cut 45 there is shown a drilled aperture or bulbular enlargement 46 at the end of the slot, this form having the additional advantage that a cementitious filler will enter into the portion 46 and on account of its shape be prevented from withdrawal from the lens even should the filler fail to adhere to the edges of the slot 45.

Fig. V is similar to Fig. VI with the exception that two of the enlargements 46 have been provided to insure still further the adherence or retention of the retaining filler within the slot. In the formation of the structure shown in Figs. V and VI for example we preferably mount the lens in the holder or carriage and shift the carriage forward until the edge of the lens comes into contact with the stop pin 47 carried by the post 48. This stop is so disposed that depressing movement of the drill spindle 11 will bring its point 27 into operative engagement with the lens at the point to form the aperture 46, for example illustrated in Fig. VI.

As it is generally considered desirable to drill as nearly as possible normal to the surface of a lens we have mounted the bed 38 for tilting movement, it swinging and thus carrying with it the carriage and lens on the trunnions 37 engaged in the bearing 32, suitable designations being formed on one of the trunnions and its corresponding bearing to denote the angular adjustment of the table, as is indicated at the left in Figs. I and XI.

In addition it sometimes proves desirable that a lens be slotted and drilled to one side or the other of the center. To attain this result the bed plate and lens carriage is preferably mounted for lateral movement, this being accomplished in the form shown in Fig. I by lateral sliding of the trunnion in the bearing, the right hand bearing being split as indicated at 49 and being adapted to be drawn together by the thumb screw or clamp 50 to lock the trunnion in desired laterally adjusted position. A similar result is accomplished by the lateral adjustment of the bracket 34 in the guide 35 illustrated in Fig. XI.

After the desired drilling operation has been completed the lens carriage may be simply advanced further inwardly and the slot 45 formed through to the aperture 46 or through the aperture as desired. To accomplish this result, however, it is necessary that the stop pin 47 be shifted out of engagement with the edge of the lens. This may be accomplished as indicated in Figs. III and IV by means of the guide way 51 in which the post 48 may slide, its position being governed by adjustment of the lock nut 52, or the post 48 may be slidably mounted as indicated in Fig. X and its position controlled by the rock lever 53 intermediately pivoted to the base 1 and having one end engaging the post to swing it into raised or lowered position, and the other end terminating in the handle portion 54 interlocking with the latch spring 55 and lock shoulder 56 which secure the post in raised position when desired, while upward swinging of the lever depresses the post to shift it out of the path of movement of the lens when the drilling operation has been completed.

If desired to limit the inward movement of the lens carriage and thus the length of slot to be formed in the end of the lens, the bed 38 may be provided with a suitable stop such as the adjustable screw stop 60, which may be set at any desired point to contact with the depending finger or stop plate 61 on the lens carriage, thus limiting the inward movement of the carriage.

While we have described the lateral shifting of the lens carriage by which decentration in a direct line of the drilling point may be accomplished, it is also desirable in certain instances that the lens be merely drilled at decentered points or that the drilling and notch both be formed at an angle to in place of parallel with the major axis of the lens.

In these instances the structure shown in Fig. IX may be advantageously employed, this construction consisting of the irregularly shaped contact plate 57 pivotally mounted upon one of the pins 43 and having a plurality of lens engaging faces 58 disposed at different precalculated distances from the pin 41. In use this plate 57 may be set as shown in the full lines in Fig. IX with the zero point contacting with the lens, when the lens will be straight in the holder, the pin on which the plate is mounted being if necessary set to one side sufficiently to compensate for this width of the plate. On the other hand, when it is desired to drill the lens considerably off center it is merely necessary to swing the plate around to bring the $\frac{1}{8}$ at the left for example into engagement with the edge of the lens as indicated in the dotted line in Fig. IX, when the lens will be automatically centered but in shifted relation so that the point to be drilled or operated upon will be a certain predetermined distance as $\frac{1}{8}$ of an inch off center in place of being directly on the center. Similarly, when it is desired to drill below in place of above center, the plate 57 is swung to bring the proper designation into engagement with the lens so that the rear end of the lens will be closer to the pin in place of farther away from it, the operation being otherwise identical.

It is believed from the foregoing description taken in connection with the accompanying drawings that the construction of our improved machine should be readily apparent. Its operation briefly stated is as follows:

The lens holding carriage is moved outwardly on the bed plate 38 and the parts 41 and 42 sufficiently separated against the tension of the spring 44 to permit of placing in position of the lens 59. The post 48 is then placed in axial alinement with the drill spindle 11 and with the pin 47 in position to engage the edge of the lens, the lens carriage being then moved inward on the guide 39 or 40 until the edge of the lens contacts with the pin 47, when depression of the handle 28 will bring the drill point into operative engagement with the lens, the drilling operation being then performed in the usual manner. The drilling operation having been performed if it is desired to in addition slot the lens, the post 48 and stop pin 47 are suitably moved downward or to one side as the case may be until the pin 47 will no longer engage the edge of the lens, when in the ordinary form of my construction it is merely necessary to continue the inward sliding movement of the carriage until the finger 56 strikes the stop 55 to limit the inward movement, at which time the desired slotting of the lens will have been completed.

It will, of course, be understood that in the form illustrated in Fig. II for example, it may be necessary to shift the bed plate and parts or else the cutting wheel laterally until the two parts are in desired relation one to the other in order that the straight cut may be formed, but the general operation is the same; that is to say, the lens is mounted within the holder, is moved inward to a certain position, there operated upon by one of the parts and is subsequently moved inward an additional amount and operated upon by the other of the tools or cutting members.

We claim:

1. In a lens drilling and cutting machine, the combination with a base, of a drill and cutter mounted on the base, a holder for the lens to be operated upon, removable means adapted to be disposed in advance of the cutter for guiding and supporting a lens during the drilling operation, means engaging the lens to insure its correct positioning relative to the cutter and means for subquently engaging the holder for the lens to limit the action of the cutter on the lens.

2. In a lens drilling and cutting machine, the combination with a base, of a drill and cutter mounted on the base, a holder for the lens to be operated upon, removable means adapted to be disposed in advance of the cutter for guiding and supporting a lens during the drilling operation, means engaging the lens to insure its correct positioning relative to the cutter, and a removable stop device carried by the lens holder and normally disposed between the cutter and the proximate edge of the lens, as and for the purpose set forth.

3. In a lens drilling and cutting machine, the combination with a base, of a drill and cutter mounted on the base and removable means adapted to be disposed in advance of the cutter for guiding and supporting a lens during the drilling operation.

4. In a machine of the character described, the combination with a base and a support rising therefrom, of a lens holding carriage mounted for movement on the support, and means for sequentially drilling and slotting the lens as the carriage with the lens is progressively advanced.

5. In a machine of the character described, the combination with a base and a lens carriage mounted on the base, of a cutter, and a removable stop device carried by the lens carriage and normally disposed between the cutter and the proximate edge of the lens, substantially as and for the purpose described.

6. In a machine of the character described, the combination with a base, a supporting bracket and a bed plate mounted on the bracket, one of the two last named parts being laterally shiftable relative to the base, and the bed plate being mounted for pivotal movement relative to the bracket, of a lens clamp carriage slidably mounted on the bed plate, and means on the base for cutting and drilling a lens when held by the carriage.

7. In a machine of the character described, the combination with a base and a bracket rising from the base, of a lens carriage slidably supported by the bracket and having a depending finger, a cutter disk mounted on the base adjacent the bracket, means for actuating said disk, the lens carriage being mounted for sliding movement toward the cutter, and a stop carried by the bracket and engaging the finger for limiting the movement of the lens and lens carriage toward the cutter.

8. In a machine of the character described, including a holder for the lens to be operated upon, means for controlling the position of the lens within the holder, a cutter and a drill, means engaging the lens to insure its correct positioning relative to the drill, and means for engaging the holder for the lens to limit the action of the cutter on the lens.

In testimony whereof we affix our signatures in the presence of two witnesses.

JOSEPH J. DEMERS.
R. L. GORDON.
F. E. SNOW.

Witnesses:
H. K. PARSENS,
G. F. FLOOD.

Copies of this patent may be obtained for five cents each, by addressing the "Commissioner of Patents, Washington, D. C."